Robert E. Brooks,
Lee O. Heflinger,
INVENTORS.

BY.

*Edward Dugas*

AGENT.

Robert E. Brooks,
Lee O. Heflinger,
INVENTORS.

Robert E. Brooks,
Lee O. Heflinger,
INVENTORS.
BY.

*Edward Dugas*
AGENT.

ated May 26, 1970

3,514,176
HIGH RESOLUTION HOLOGRAPHIC BEAM
REVERSAL TECHNIQUE
Robert E. Brooks, Redondo Beach, and Lee O. Heflinger, Torrance, Calif., assignors to TRW, Inc., Redondo Beach, Calif., a corporation of Ohio
Filed June 20, 1967, Ser. No. 647,374
Int. Cl. G02b 27/22
U.S. Cl. 350—3.5                3 Claims

ABSTRACT OF THE DISCLOSURE

This invention is a method of reversing the direction of the reference beam with respect to a hologram during reconstruction to provide an accessible, aberration-free image which can be viewed with a conventional high-magnification microscope. If a collimated beam is used for construction, the beam reversal can be accomplished simply by turning the hologram plate over during the reconstruction. If a diverging beam is used in the recording step, it is necessary to use a converging beam during the reconstruction step and to ensure that the points of divergence and convergence coincide. Similarly, a convergent beam can be used for recording and a divergent beam for reconstruction.

BACKGROUND OF THE INVENTION

This invention relates generally to the field of holography and, more particularly, to a novel means for minimizing aberrations and increasing the resolution of images created by the holographic process.

Holography (or lens-less photography) is based upon the recording on film of a diffraction which is created by the interference between light scattered from an object or scene that has been illuminated and directly impingent light from the same light source. The exposed film is then developed and upon illumination with light from either the same or a similar coherent light generating source, positioned in the same geometric relation with respect to the developed film, produces a diffracted beam which is a reconstruction of the original pattern scattered from the scene at the time of exposure. This particular property results in a (true) virtual three-dimensional image whose perspective changes with viewing angle. This virtual image can be examined and processed with conventional optical instruments such as microscopes, telescopes and copy cameras, with the result that the virtual image can be examined at leisure in various focal planes from a single hologram plate. The plate on which the hologram is produced is a high resolution photographic plate which is exposed to the reference and scene beam and subsequently developed. In U.S. patent application Ser. No. 503,976 entitled "Interferometry Method and Apparatus With Holographically Reconstructed Comparison Beams," filed Oct. 23, 1965, by R. E. Brooks, et al., there is disclosed an apparatus for creating an interferometry pattern on a holographic plate. In this patent application, the technique of stored beam interferometry teaches that when a hologram is reconstructed under the same conditions as when it was made, the reconstructed wave fronts of the virtual image are identical to the wavefronts of the original object, implying that the resolution obtainable in the holographic image is theoretically limited only by diffraction from the hologram aperture. Thus, in principle, it is possible to record subjects which are distributed throughout a large volume of space and to examine the reconstructed image with a microscope to take advantage of the high resolution recorded by the hologram.

Unfortunately, the short working distances of the usual high-magnification microscope does not permit the full exploration of the virtual image space because of the physical intervention of the hologram plate between the virtual image and the microscope. In addition, spherical aberrations introduced by looking through the relatively thick hologram support plate (cover glass effect) further complicates high resolution viewing.

The real (conjugate) image is readily accessible to the viewing microscope since it lies on the side of the hologram plate near the observer; however, it suffers from many defects. Unless the reference beam is collimated, the image does not appear true-sized and is aberrated by the holographic process. As in the case of the virtual image, spherical aberration is introduced by the passage of the converging reconstructed rays through the hologram plate. Moreover, even if a collimated reference beam is used and the effects of the hologram support are neglected, the real image is aberration-free only for an infinitely thin emulsion.

The volume effect of a thick emulsion manifests itself in two undesirable ways on the real image. First, when the fringe spacing is small compared to the emulsion thickness, the exposed regions have the appearance of slats in a Venetian blind which are tilted so that they bisect the angle formed by the scene and reference rays at each point. The hologram plate then acts like a blazed grating and preferentially diffracts a greater portion of the reconstructed light into the virtual image at the expense of the real image.

Second, the real image is smeared. This can be seen by substituting for a thick emulsion, two infinitely thin but finitely separated emulsions. Since the same configuration is used for recording and reconstruction, the virtual images reconstructed from each plane will coincide; however, the real images will not coincide since their location is determined both by the position of the original subject and the hologram emulsion position. It is therefore highly desirable to have a method for achieving aberration-free image viewing which also provides the accessibility of the real image so that it can be viewed with conventional short working distance instruments.

SUMMARY OF THE INVENTION

Briefly, in accordance with one embodiment of this invention, for viewing a hologram of an object, coherent radiation from a source is scattered by the object, a radiation-sensitive plate means is exposed to reference coherent radiation from the source and the scattered coherent radiation. After exposure, the radiation-sensitive plate means is processed to produce a hologram plate. Viewing of the hologram is accomplished by reversing the direction of the reference coherent radiation through the plate. Viewing through the hologram in the reverse direction provides an almost aberration-free image.

Accordingly, it is a primary object of the present invention to provide a method for improved viewing of a hologram.

It is a further object of the present invention to provide a novel method for minimizing aberration effects in holograms.

The foregoing and other objects and features of the present invention will become more apparent and better understood when taken in conjunction with the following description and the accompanying drawings, throughout which like characters indicate like parts, and which drawings form a part of this application.

DESCRIPTION OF THE PREFERRED EMBODIMENT

Figure 1:
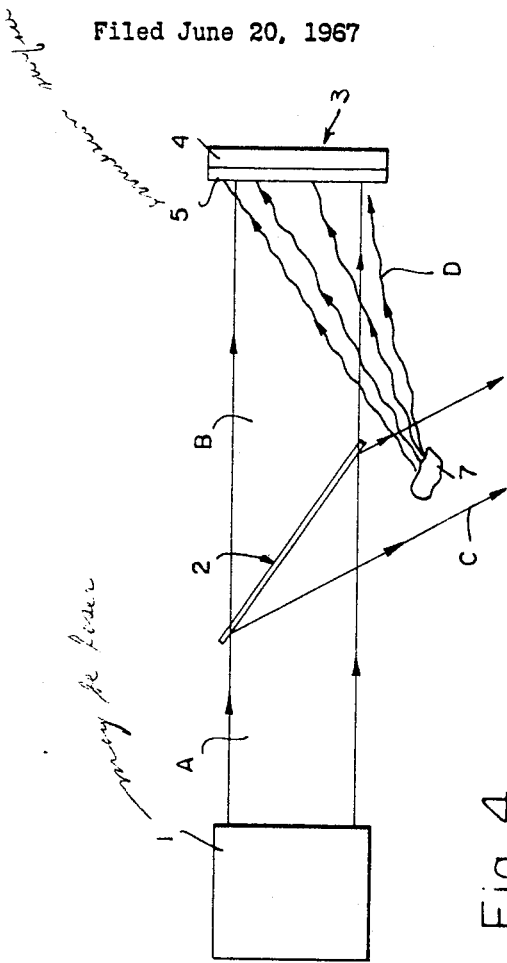
FIG. 1 illustrates a two-beam holographic photography apparatus in diagram form which may be utilized with the method of this invention for recording and viewing holography images of objects.

Referring now to FIG. 1, a source of coherent radiation 1 provides a beam A. A laser such as a He-Ne gas laser, may be used for the coherent radiation source 1. A beam A is split into two beams, B and C, respectively, by means of a beam splitter 2. The beam splitter has a beam-splitting surface which is partially silvered so that the beam A is partially reflected from the surface of beam splitter 2 to form the beam C and partially transmitted through the beam splitter 2 to form the beam B. A radiation-sensitive holographic plate 3 is positioned with its sensitive surface approximately perpendicular to the path of beam B. The holographic plate 3 is comprised of an emulsion surface 5, supported by a rigid plate 4, which, in most cases, is a glass plate. It is also possible to use a thick recording media such as photochromic glasses, for the emulsion 5 and, if such is the case, the supporting plate 4 would not be necessary. An object 7, which is to be examined, is positioned in the beam C so as to scatter a portion of the beam C toward the holographic plate 3. The portion of the beam that is scattered is designated D. After the radiation-sensitive plate has been exposed to the coherent radiation beam, it is developed with standard processes and a hologram results.

Figure 2:
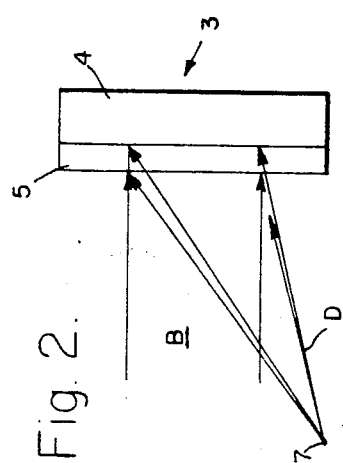
FIG. 2 is an enlarged view of a portion of the apparatus illustrated in FIG. 1.

FIG. 2 illustrates in an enlarged view the paths that the various rays from the object and from the reference beam B travel both to and through the emulsion 5. Because the emulsion has a finite thickness a volume effect takes place. The effects can be visualized by substituting the front and back surfaces of the thick emulsion with two infinitely thin but finitely separated emulsions. Two images will be recorded, but they will be displaced by the emulsion thickness and the angles at which the scattered rays forming the beam D strike the two surfaces will be slightly different.

Figure 3:
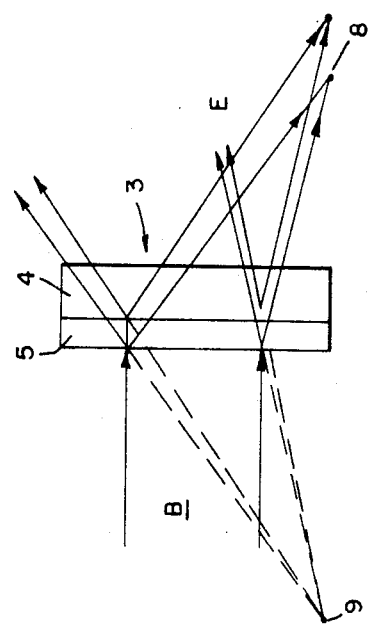
FIG. 3 illustrates a prior art method of reconstructing the real image from the apparatus of FIG. 2.

In FIG. 3, the prior art method of reconstructing the real image from the hologram applies the reference beam B to the hologram plate 3 in exactly the same direction as was used to record the hologram plate. The result is that the real image 8 appears smeared, while the virtual image 9 reconstructed from each plane will coincide and be clear, since their loaction is determined both by the position of the original subject and the hologram position.

Figure 4:
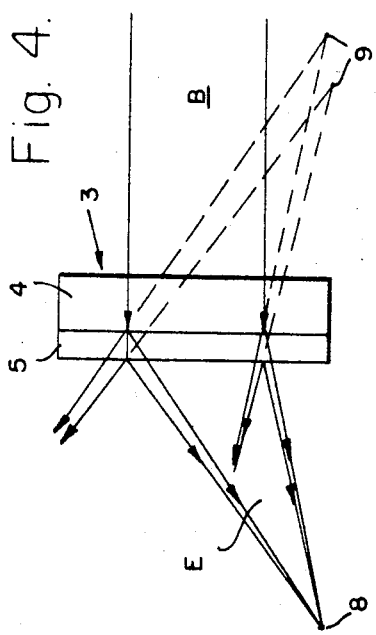
FIG. 4 illustrates the method of reconstructing the real image in accordance with the method of this invention.

In FIG. 4, the reference beam B is reversed in directio nsuch that it passes through the support 4 and then through the emulsion 5 in a reverse direction. This results in a smearing of the virtual image 9 with a clear reproduction of the real image 8. This reproduced image 8 will be aberration-free because the rays that make up the real image retrace exactly the same path that they assumed during the recording step. If a collimated beam is used for recording and reconstruction such as, for example, beam B, it is necessary only to turn the holographic plate 3 around to reverse the reference beam direction with respect to the plate. If a diverging beam is used in the recording step, it is necessary to use a converging beam during reconstruction and also to ensure that the points of divergence and convergence coincide. Similarly, a convergent beam can be used for recording and a diverging beam for reconstruction. An advantage to be gained in using a collimated beam is the absence of aberration in the reconstructed image due to the <u>thickness of the hologram support</u> 4. If the emulsion 5 faces the <u>subject during recording</u>, it will be on the side opposite the light source during reconstruction, and if the support is of a high optical quality, the collimated beam will be unaffected as it passes through. In the reverse situation, where the support faces the subject during the recording step, the aberrations introduced by the support are cancelled during reconstruction. Although aberrations are introduced when diverging or converging beams are used, they are negligible if the angle of divergence or convergence is not great.

Figure 5:
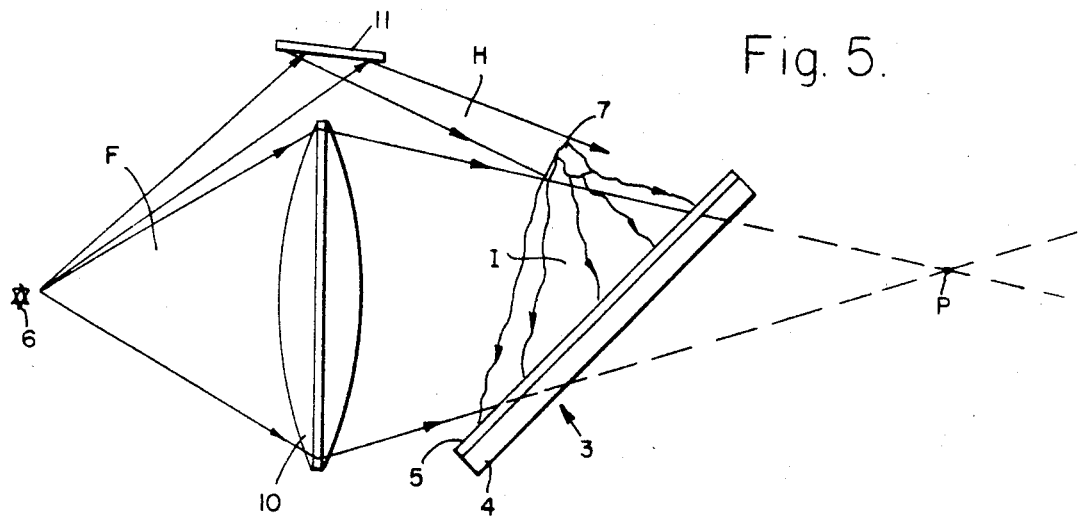
FIG. 5 illustrates a converging two-beam holographic apparatus for making holograms.

Referring now to FIG. 5, wherein a converging beam is used to record the subject on the holographic plate, a source of coherent radiation 6 which in diverging forms a beam F which is focussed by means of lens 10 to a point P. Interposed between the lens 10 and the point P is the holographic plate 3 with the emulsion surface 5 facing the lens 10. A portion of the beam is reflected by means of mirror 11 so as to form a second beam H in the path of which is inserted the object to be recorded 7. Radiation from beam H is scattered from the object 7, forming a scattering beam I which is directed, and impinges onto, the emulsion surface 5. When the holographic plate is developed, a hologram of the object 7 will be recorded in the emulsion of the plate. To achieve optimum reconstruction of the object, it is necessary to use a diverging beam whose point of divergence corresponds exactly to the location of the convergence point of the beam used for recording.

Figure 6:
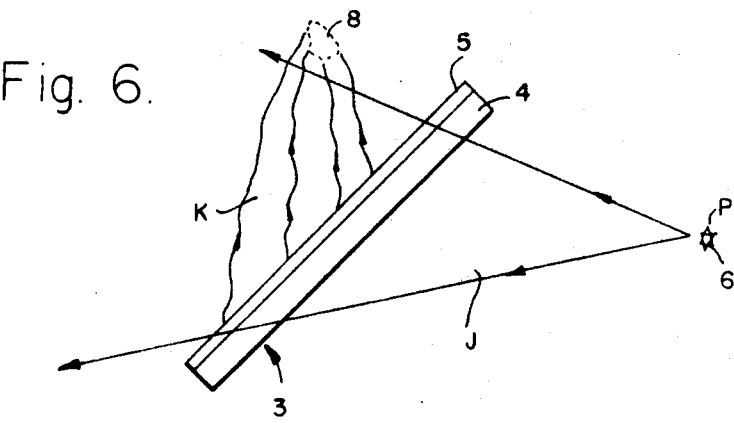
FIG. 6 illustrates the method of reconstructing the real image in accordance with the method of this invention, as applied to the apparatus of FIG. 5.

FIG. 6 illustrates the use of the diverging beam reconstruction. A coherent source 6 is placed at the focal point P so as to generate a diverging beam J which passes through the holographic plate 3 and reconstructs a real image 8 by means of the reflected rays K.

Figure 7:
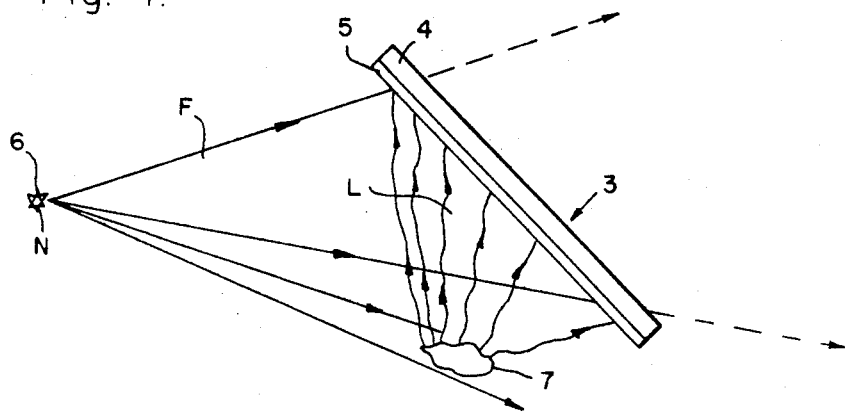
FIG. 7 illustrates a diverging two-beam holographic apparatus for making holograms.
Figure 8:
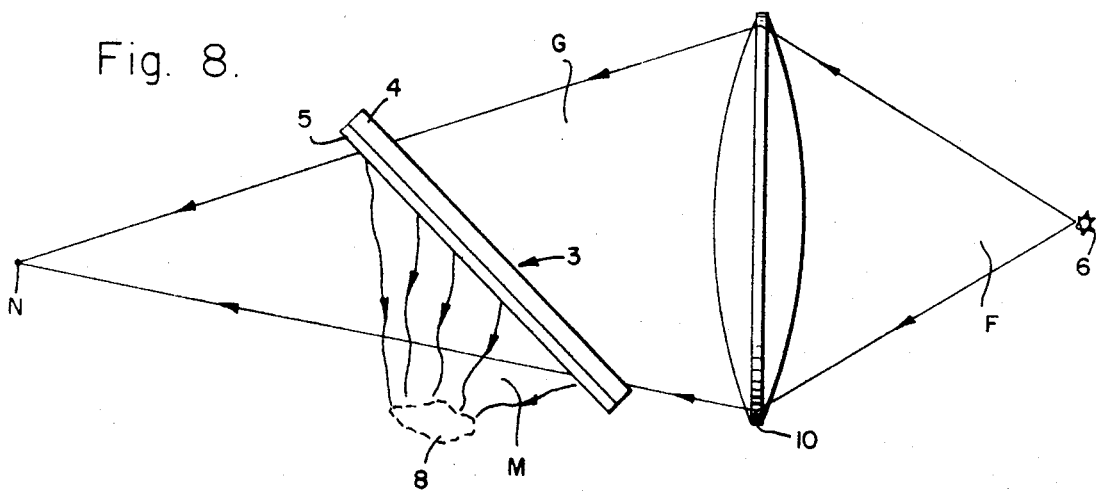
FIG. 8 illustrates the method of reconstruction of the real image in accordance with the method of this invention as applied to the apparatus of FIG. 7.

Referring now to FIG. 7 for the diverging recording case, a source of coherent radiation 6 is positioned at a point N, generating a diverging beam F. The holographic plate 3 is positioned in the path of at least a portion of the diverging beam F with its emulsion surface 5 facing the coherent source 6. The object to be recorded 7 is also positioned so as to intercept at least a portion of the diverging beam F, thereby causing a reflected or scattered beam L to be directed upward to the emulsion surface 5. The holographic plate 3 is then developed and positioned in the exact position with respect to point N as it was during the recording step with the coherent source 6 shifted in position to have the diverging beam F pass through a lens 10 so as to be focussed on the point N, thereby creating a converging beam which exactly corresponded to the diverging recording beam used to make the original hologram. The converging beam G then passes through the hologram plate 3, causing a diffracted beam M to reconstruct the real image 8 of the object.

In summary, the volume effect of a thick emulsion which manifests itself in undesirable ways by causing the usual real image to be smeared or aberrated is minimized by the method of this invention, which involves reversing the direction of the reference beam through the holographic plate so as to recreate a real image of the subject in exactly the same position that was held by the subject when the hologram was produced. This reversal of the reference beam effectively eliminates aberrations in a reconstructed real image due to the thickness of the hologram support while maintaining accessibility of the real image for examination with microscopes of short working distance. If, in addition to beam reversal, a parallel beam is used for the reference beam, then the cover glass aberrations associated with the hologram support are also eliminated.

While there has been shown what are considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A method of creating and viewing a high resolution relatively thick hologram comprising the steps of:
   (a) directing a first coherent radiation beam consisting substantially of spherical waves having a predetermined center of curvature onto a relatively thick, radiation-sensitive recording means in a first direction to provide a reference beam, said center being at a finite distance from said recording means;
   (b) directing a portion of said coherent radiation beam to an object so as to scatter said beam onto said radiation-sensitive means;
   (c) processing said radiation-sensitive means to produce a hologram; and
   (d) viewing said hologram by directing a second coherent radiation beam consisting substantially of spherical waves having the same predetermined center as curvature as said reference beam through said hologram and in a direction opposite said first direction so as to impinge on the side of said hologram opposite the side from which said hologram was initially illuminated.

2. The method as defined in claim 1, wherein said first beam is divergent and said second beam is convergent.

3. The method as defined in claim 1, wherein said first beam is convergent and said second beam is divergent.

References Cited

Leith et al., Jour. of the Optical Soc. of Am., vol. 55, No. 8, August 1965, pp. 981–985.

Leith et al, Applied Optics, vol. 5, No. 8, August 1966, pp. 1303–1311.

DAVID H. RUBIN, Primary Examiner

R. J. STERN, Assistant Examiner